No. 851,309. PATENTED APR. 23, 1907.
W. F. OVERMYER.
GIN.
APPLICATION FILED JUNE 19, 1906.
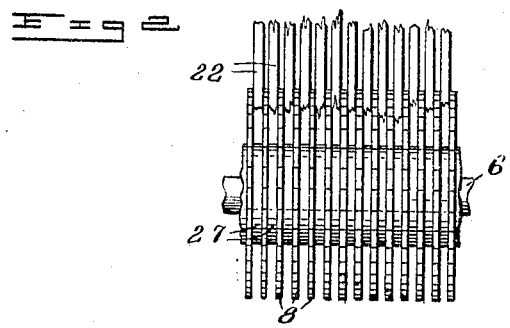
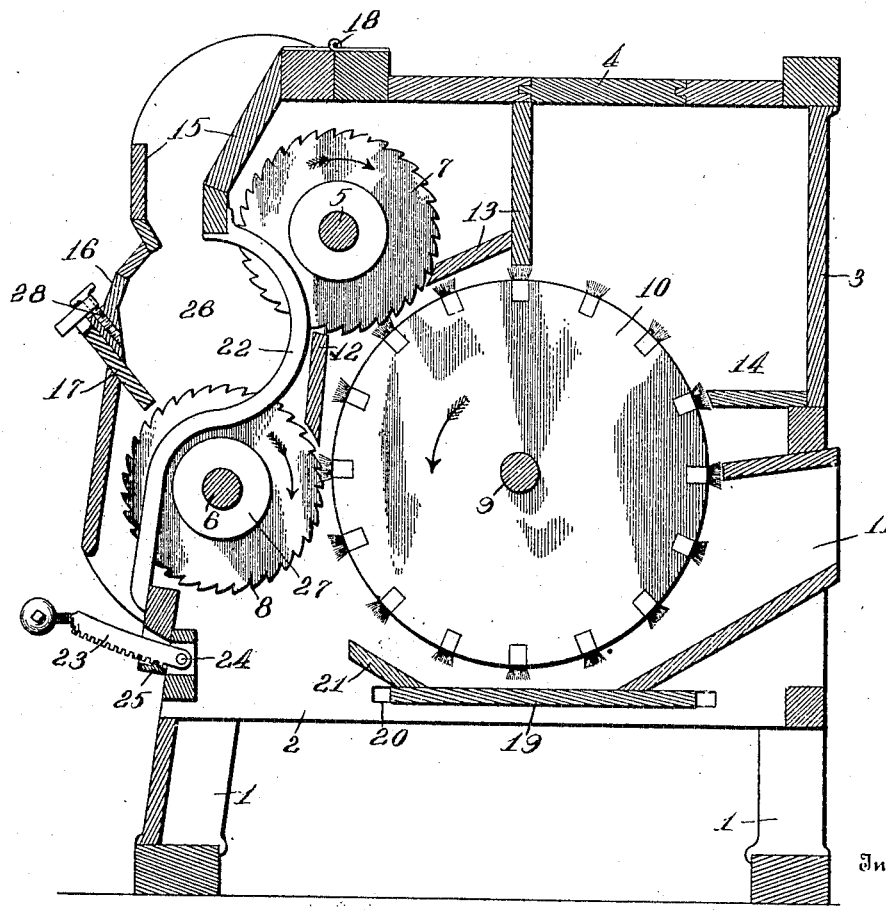

UNITED STATES PATENT OFFICE.

WILLIAM F. OVERMYER, OF BEECHWOOD, MISSISSIPPI.

GIN.

No. 851,309.  Specification of Letters Patent.  Patented April 23, 1907.

Application filed June 19, 1906. Serial No. 322,365.

*To all whom it may concern:*

Be it known that I, WILLIAM F. OVERMYER, a citizen of the United States, residing at Beechwood, in the county of Amite and State of Mississippi, have invented certain new and useful Improvements in Gins, of which the following is a specification.

My invention relates to an improvement in gins, and it consists in the constructions, combinations and arrangements herein described and claimed.

An object of my invention is to provide a compact form of gin having a high capacity, and especially adapted for reginning cotton seed in preparing the seed for manufacture into cotton seed products.

A further object of my invention is to provide a simple and durable form of gin, operating with a minimum of power, and constructed to completely delint the cotton seeds, thereby avoiding waste or loss of the cotton fibre.

In the accompanying drawings, forming a part of this application and in which similar reference symbols indicate corresponding parts in the several views: Figure 1 is a central, vertical, sectional view, illustrating one embodiment of my invention, and Fig. 2 is a detail view of the lower rotating set of saws.

Referring to the drawings, 1 indicates suitable supports for a casing comprising side walls 2, a rear wall 3, and a top 4. Shafts 5 and 6, suitably journaled in the casing, carry, respectively, an upper and a lower set of gin saws 7 and 8 at the front portion of the casing. A shaft 9, journaled in the casing, carries a brush cylinder 10 for removing the lint from both sets of rotatable saws and discharging it through a lint flue 11; baffle plates, or wind guards, 12, 13 and 14 being arranged in proximity to the periphery of the brush cylinder. A mote board 19 is adjustably supported in guides 20 on the casing, and carries a deflector 21 for separating heavier impurities, such as dirt, sand, etc., from the lint prior to its discharge into the lint flue 11. This construction permits adjustment of the deflector 21 to produce an efficient separation of heavier impurities from the lint for all grades of seed cotton.

The material is supplied to the gin by an adjustable feeding means comprising a hopper 15, a breast board 16 and a seed board 17. A grating comprising bars 22 is carried by the adjustable feeding means in position to extend between the several saws of the upper and lower sets 7 and 8; the several bars being set sufficiently close together to prevent passage of cotton seed therebetween. The feeding means is adjustably secured to the casing, as by a hinge joint 18, and I have shown a rack lever 23 pivoted at 24 to the casing and engaging a lug 25 on the feeding means for locking the latter in its several adjusted positions about its pivotal support 18.

The lower set of saws 8 are positioned to constitute the bottom of a roll chamber 26 in which the material is balled or rolled, by the action of the gin saws thereon. The several saws of the lower set 8 are spaced apart by spacing members 27 a sufficient distance to permit the entrance of cotton seeds therebetween, and the seed board 17 is provided with an adjusting screw 28 for enabling it to be adjusted in close proximity to the periphery of the lower set of saws 8.

In the operaton of my invention, the material is fed through the hopper 15, and the gin saws strip the lint from the cotton seeds in the roll chamber 26 and carry it past the grating 22 to the brush cylinder 10. The brush cylinder cleans the lint from the saws in the usual manner and discharges it against the mote board 19 and into the lint flue 11; the rapid motion of the brush cylinder acting to produce a current across the mote board and through the lint flue. During such discharge of the lint from the brush cylinder, any heavy impurities mixed with the lint will be deflected downwardly by the adjustable deflector 21; thus separating it from the lint which will be drawn by the air current across the upper surface of the mote board and discharged into the lint flue.

The cotton seeds, after being delinted in the roll chamber 26 drop between the several saws of the set 8 constituting the bottom of said chamber, and are discharged from the gin past the front surfaces of the spacing members 27. This construction prevents the discharge of any partially delinted seeds from the roll chamber, since the saws 8 will engage any lint remaining on partially stripped seeds and prevent the latter from dropping within the small spaces between the several saws.

The adjustable feeding means carrying the grating 22, provides a convenient means for varying the action of the gin saws on the cotton within the roll chamber 26, thereby enabling the gin to be set, or adjusted, for operating efficiently on all characters and grades of material.

I have illustrated and described a preferred and satisfactory construction, but, obviously, changes could be made within the spirit and scope of my invention.

Having thus described my invention, what I claim as new and desire to secure by Letters Patent is:—

1. In an apparatus of the character described, the combination of two independent sets of rotatable gin-saws, a grating extending between the several saws of said two sets, an adjustable feeding means for supplying material to said saws, and means for simultaneously adjusting the position of said grating relative to the said two sets of saws and for varying the capacity of the feeding means.

2. In an apparatus of the character described, the combination of two independent sets of rotatable gin-saws, a grating extending between the several saws of said two sets, an adjustable feeding means for supplying material to said saws, means for simultaneously adjusting the position of said grating relative to the said two sets of saws and for varying the capacity of the feeding means, a seed board, and means for independently adjusting said seed board relative to the saws.

3. In an apparatus of the character described, the combination of two independent sets of rotatable gin saws, a grating extending between the several saws of said two sets, an adjustable feeding means for supplying material to said saws, said grating being secured to the movable part of said adjustable feeding means and adapted to move simultaneously therewith, means for simultaneously adjusting the position of said grating with respect to said two sets of saws, and for varying the capacity of the feeding means, a seed board, and means for adjusting said seed board relative to the saws.

In testimony whereof I affix my signature in presence of two witnesses.

WILLIAM F. OVERMYER.

Witnesses:
R. S. STEWART,
O. J. CAUSEY.